United States Patent [19]

Kerins et al.

[11] Patent Number: 4,665,682
[45] Date of Patent: May 19, 1987

[54] METHOD FOR PRODUCING A HOT FILLABLE, COLLAPSE RESISTANT POLYESTER CONTAINER WITHOUT THE NEED TO UTILIZE SET PROCESS TECHNIQUES AND/OR NON-CONVENTIONAL CONTAINER GEOMETRIES

[75] Inventors: Gerard J. Kerins, New Fairfield, Conn.; Wayne N. Collette, Merrimack, N.H.; Martin H. Beck, Merrimack, N.H.; Richard E. Clark, Merrimack, N.H.; Ieuan L. Harry, Nashua, N.H.; Suppayan Krishnakumar, Nashua, N.H.; Bryan H. Miller, Nashua, N.H.; Richard C. Nichols, Tyngsboro, Mass.; David Piccioli, Auburn, N.H.; Louis D. Tacito; Eileene M. Worsowicz, both of Merrimack, N.H.

[73] Assignee: Continental PET Technologies, Inc., Stamford, Conn.

[21] Appl. No.: 730,113

[22] Filed: May 3, 1985

[51] Int. Cl.⁴ .................. B65B 3/04; B65B 7/00; B29C 49/22
[52] U.S. Cl. .................. 53/452; 264/37; 264/513; 264/515; 264/524; 264/532
[58] Field of Search .......... 264/521, 524, 525, 532, 264/512, 513, 515, 516, 37; 53/452

[56] References Cited

U.S. PATENT DOCUMENTS

| | | | |
|---|---|---|---|
| 3,733,309 | 5/1973 | Wyeth et al. | 264/513 X |
| 3,822,332 | 7/1974 | Hrach et al. | 264/537 |
| 4,235,837 | 11/1980 | Noonan | 264/521 X |
| 4,318,882 | 3/1982 | Agrawal et al. | 264/521 |
| 4,385,089 | 5/1983 | Bonnebat et al. | 264/537 X |
| 4,496,064 | 1/1985 | Beck et al. | 264/532 X |
| 4,512,948 | 4/1985 | Jabarin | 264/521 |
| 4,550,007 | 10/1985 | Ohtsu et al. | 264/532 X |

FOREIGN PATENT DOCUMENTS 1126034  9/1968  United Kingdom ............... 264/553

Primary Examiner—Jan H. Silbaugh
Assistant Examiner—Neil M. McCarthy
Attorney, Agent, or Firm—Charles E. Brown

[57] ABSTRACT

This relates to a method of forming a thermal/collapse-resistant highly oriented polyester container for use in hot fill applications. In accordance with the method of a polyester preform is reheated and then placed in a blow mold cavity whereat the preform is distended to match the blow mold cavity to form an intermediate article including a container having an oriented end unit receiving finish of a diameter materially greater than the diameter of the preform. The method is characterized in that in providing the preform the composition of the polyester, the draw ratio during distending of the preform and reheat conditions are all controlled to provide a container with a sidewall and finish density in the range of 1.350 to substantially but less than 1.370 grams/cubic centimeter.

10 Claims, 20 Drawing Figures

U.S. Patent  May 19, 1987  Sheet 1 of 3  4,665,682
FIG.1A PRIOR ART
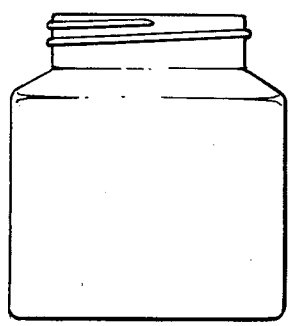
FIG.1B PRIOR ART
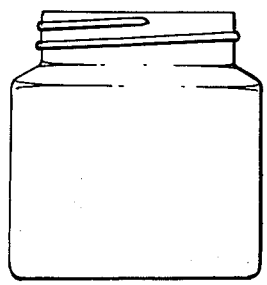
FIG.1C PRIOR ART
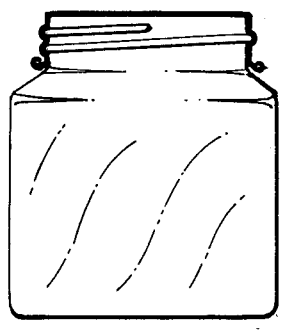
FIG.2
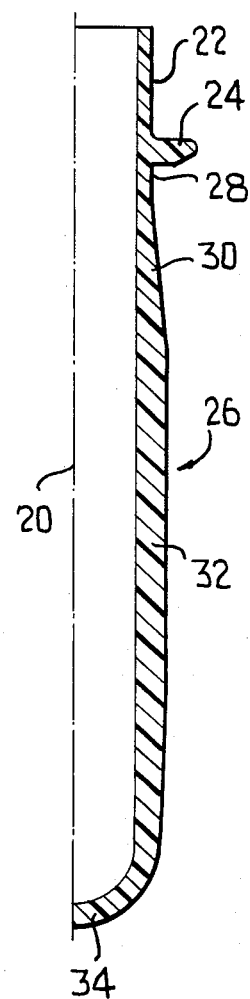
FIG.3
FIG.4
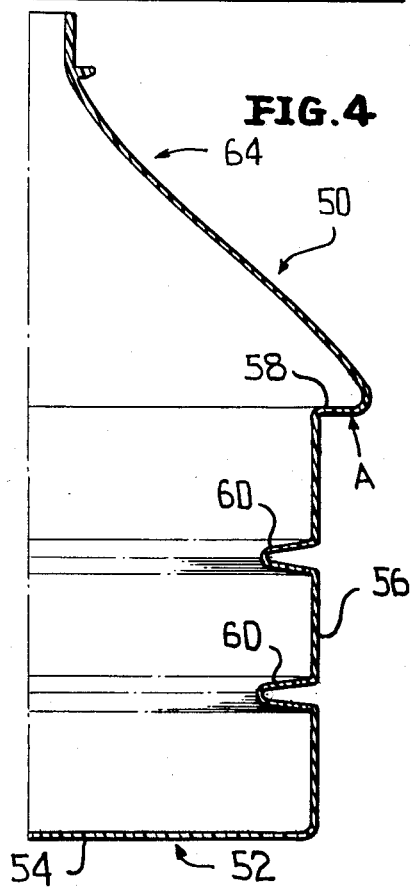
FIG.9
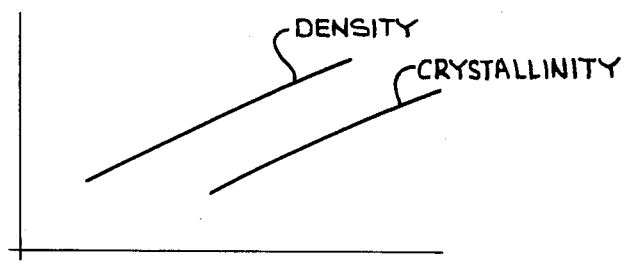
DENSITY
CRYSTALLINITY

METHOD FOR PRODUCING A HOT FILLABLE, COLLAPSE RESISTANT POLYESTER CONTAINER WITHOUT THE NEED TO UTILIZE SET PROCESS TECHNIQUES AND/OR NON-CONVENTIONAL CONTAINER GEOMETRIES

Containers formed from biaxially oriented PET materials in the shape of narrow mouth bottles, wide mouth jars, and cans have found increased market acceptance over the past few years.

For the most part, these containers have been limited to product applications involving low to moderate fill temperatures such as soft drinks, edible oils, mustards, tennis balls, etc. It has been estimated that 25% of the 20+ billion unit food package market (currently captive in metal and glass) could be captured by polymer containers if the latter could provide acceptable performance when hot filled with products in the 160°–200° F. temperature range.

It is known, however, that two distinct distortion phenomenon occur when PET (polyethylene terephthalate) containers produced by conventional injection blow, reheat blow and/or other techniques are hot filled and sealed.

The first involves excessive container thermal shrinkage and resulting distortion when exposed to temperatures that approach or exceed the glass transition (Tg) or softening temperature of PET (approximately 170° F.). The second deforming phenomenon results from the partial internal vacuum generated in the container after it is hot filled and then sealed with the contents still at or near the filling temperature. As the product itself and its head space gases cool, the resulting volume contractions induce a partial internal vacuum which in turn creates a net inward force on the container sidewall which may cause the latter to buckle or collapse.

The occurrance of either phenomenon renders conventionally produced PET containers unacceptable for commercial applications involving elevated filling temperatures.

As recognized in the art, thermal shrinkage can be alleviated through the application of a post forming heat treatment process. It is well known that the distortion temperature of PET (Tg) can be raised by increasing the percent crystallinity of the "finished" polymer well above that of the amorphous or preform state. In blown containers, the latter is achieved (1) by the preform orientation process (which yields strain induced crystallization) as well as (2) by constrained post blow conditioning in a heated blow mold at temperatures somewhat above the expected product service temperature (which yields thermal induced crystallization). Strain induced crystallization alone is known to increase percent crystallinity to a substantial degree, but considerably less than the percent crystallinity (i.e., Tg) levels attainable with heat set thermal conditioning.

As such prior art PET containers for hot fill applications have been prepared using thermal conditioning techniques. The commercial viability of the latter (so called "heat set" process), however, is diminished by several key constraints which involve (1) the time required to thermally condition and cool the container walls prior to removal from the blow mold and (2) the crystallization properties of PET which vary considerably with chain morphology and as such directly influence the visual aesthetics and physical properties in the final container as a function of orientation or draw level.

For example, established methods of raising the Tg of PET container walls, require relatively long mold residence times (on the order of 5–20 seconds) to yield the desired level of thermal conditioning (usually defined as 1% maximum container volume shrinkage when filled at 190° F.). The vast majority of existing PET products, however, are formed on two stage, high output, intermittent motion, reheat blow molding machines which would suffer a significant reduction in productivity (i.e. throughput per unit time) if the above mold residence times were employed. Similar throughput and/or other economic disadvantages exist with rotary reheat and injection blow conversion techniques.

Beyond excessive mold residence times, the commercial viability of know heat set techniques is also limited by the tendency of unoriented, essentially amorphous PET to turn milky white and opaque when thermally crystallized. As such, it is usually necessary to cool the low orientation neck finish, shoulder, and base of a biaxially oriented PET container to prevent excessive crystallization and whitening of these areas during heat set thermal conditioning, if a fully transparent container is desired. The highly oriented bottling sidewalls, of course, remain transparent despite high levels of thermal induced crystallization. These morphological phenomenon force the bottle producer to (1) purposely crystallize and whiten the unoriented container regions and risk potential problems with market acceptance (visual asethetics) and loss of physical properties (reduced impact resistance of unoriented crystalline regions) or (2) minimize unoriented material crystallization and suffer probable thermal container distortion during hot filling. (A common solution to the latter involves increasing the wall thickness of the unoriented, uncrystallized regions to strengthen the latter and reduce the potential of thermal distortion. Again, however, increased unit costs severely limit this approach.)

Beyond thermal distortion, prior art recognizes several approaches to alleviating pressure induced vacuum collapse. Increasing container wall thickness in conjunction with reinforcing ribs, beads, or other structural features can be effective, however disadvantageous from a unit cost and/or geometric standpoint. In addition, the patent literature also recognizes solutions involving intentional thermoelastically deformable and pressure deformable container regions which move inwardly under the influence of the product temperature, and resulting partial internal vacuum to offset or eliminate the latter. The principal disadvantage with this approach stems from the need to radically alter conventional container geometry and the resulting marketing complications associated with product image, consumer acceptance, etc.

An economically and commercially viable PET container which would not exhibit either thermal or vacuum induced distortion would open substantial new market segments to the lighter weight, transparent, and shatterproof PET packages. The prior art provides various solutions to the above problems, however, they do so only by compromising container economics (unit costs) and market acceptability (nonconventional geometries).

As such, it is the primary objective of the present invention to provide an improved method of producing cost effective, hot fillable PET containers that exhibit commercially acceptable thermal shrinkage with no vacuum collapse (when hot filled and sealed at temperatures up to and including 200° F.) without the need for post forming heat treatment and/or nonconventional container geometries.

In addition, a novel solution to the vacuum induced deformation problem for conventional container geometries is provided through the application of specific process control and product design techniques (in the container production and filling process) to yield controlled levels of container shrinkage and "controlled" vacuum collapse as required to achieve minimal internal vacuum levels with acceptable filled container dimensional consistency.

These and other objects of the present invention are provided partially through the application of wide mouth PET container manufacturing technology as described in U.S. Pat. No. 4,496,064 to Beck et al.

The above described wide mouth technology utilizes PET preforms produced by conventional techniques to, in turn, produce wide mouth bottles and cans with biaxially oriented thread and/or flange areas. The resulting container finish, being oriented to a controlled degree, overcomes the disadvantages of non-oriented amorphous polyester in heat set/hot fill processes as described earlier.

With the above and other objects in view that will hereinafter appear, the nature of the invention will be more clearly understood by reference to the following detailed description, the appended claims, and the several views illustrated in the accompanying drawings.

FIG. 1A is an elevational view of a polyester container produced by a conventional technique.

FIG. 1B is an elevational view of the same container after being filled with a hot product at a temperature of 190° F.

FIG. 1C is an elevational view of the container of FIG. 1A wherein the container was improved by heat setting and then hot filled at 190° F. with the container exhibiting a volume loss of 1% and having a convoluted, non-conventional vacuum collapsed geometry.

FIG. 2 is a half sectional view taken through a typical preform utilized in conjunction with the present invention.

FIG. 3 is a half sectional view taken through a standard mold defining a blow cavity and having positioned therein the preform of FIG. 2 prior to blow molding.

FIG. 4 is a half vertical sectional view of the resultant intermediate article from blow molding the preform of FIG. 2 in the mold cavity of FIG. 3.

FIG. 9 is a graph showing typical wall density measurements and calculated percent crystallinity for containers formed in accordance with the aforementioned Beck et al patent vs. conventionally produced wide mouth jars.

FIG. 7 is a graph showing typical volume shrinkage curves as a function of hot fill temperature for containers produced by various techniques.

Figure 5:
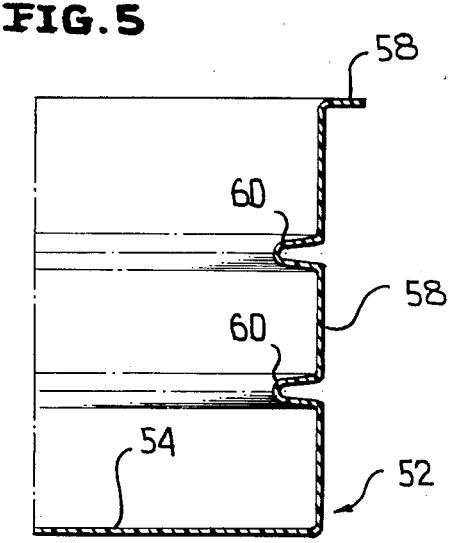
FIG. 5 is a half sectional view of a polyester can resulting from the severing of the intermediate article of FIG. 4 along the path of the arrow A.

Polyester containers when produced by conventional reheat or injection blow techniques exhibit excessive thermal shrinkage of from 15–50% volume loss when hot filled at 190° F. An example of such a container is shown in FIG. 1. As noted earlier, the prior art provides solutions to the polyester thermal distortion problem by conditioning the blown container in a heated blow mold to raise the polymer Tg (i.e. softening temperature) to somewhat above 190° F. The heat set process accomplishes the above by increasing the polyester percent crystallinity in the bottle sidewalls. The Tg of highly crystalline polyester (i.e. above 50% crystallinity) is in excess of 350° F. (i.e. Tg increases with increasing percent crystallinity). Density as measured by ASTM test method #1505 is a useful measure of crystallinity as per:

$$\text{percent crystallinity} = \frac{ds - da}{dc - da} \times 100$$

where:
  ds = sample density in g/cm$^3$
  da = 1.333 g/cm$^3$ (amorphous)
  dc = 1.455 g/cm$^3$ (100% crystalline)

TABLE 1

|  | FIGS. 1A, B | FIG. 1C |
|---|---|---|
| FINISH DENSITY (g/cm$^3$) | 1.341 | 1.388 |
| FINISH % DIAMETER SHRINKAGE | 1.22 | 0.08 |
| SIDEWALL DENSITY (g/cm$^3$) | 1.357 | 1.372 |
| SIDEWALL % DIAMETER SHRINKAGE | 10.5 | 0.52 |
| SIDEWALL % HEIGHT SHRINKAGE | 8.8 | 0.40 |

Table 1 above shows density vs. percent shrinkage data for the container shown in FIG. 1.

In general, heat set containers exhibit less than 1% volume loss when filled at 190° F. and sidewall density measurements in excess of 1.365 g/cm³ and usually in excess of 1.370 g/cm³ (26% and 30% crystallinity respectively).

Although heat set containers exhibit acceptable thermal distortion when filled at 190° F., they remain susceptible to pressure induced vacuum collapse. Partial vacuum levels in excess of 8-16 psi (depending on fill level, product fill temperature, etc.) are typically seen in rigid containers after the contents cool to ambient. To prevent the distortion of the flexible polyester sidewalls, non-conventional container geometries such as convoluted panels are utilized to control deformation usually in conjunction with structural features such as ribs, beads and increased sidewall thickness. In addition to increased unit costs the marketing disadvantages associated with the radical geometries are substantial.

In addition, prior art heat set containers must prevent excessive distortion of the finish region during hot filling to effect proper closure application and sealing. Certain bottles, for example, utilize a pre-crystallized, opaque finish to minimize distortion. Although effective, this method adds considerably to unit costs. Other bottles maintain finish transparency by utilizing increased wall thickness (vs. conventional non-hot fill containers) to minimize distortion. The added costs associated with the latter approach limits its usefulness.

The following then demonstrates a novel method of producing hot fillable polyester containers without the negatives associated with heat set approaches:

FIGS. 2-6 illustrate the manner in which cans, bottles and jars molded from conventional single or multilayer injection or extrusion molded preforms in accordance with the afore-described Bect et al patent and which exhibit highly oriented flange and/or finish regions.

Reference is now specifically made to FIG. 2 wherein there is illustrated a preform particularly provided in accordance with this invention. The preform is circular in cross section about a center axis 20 and includes an upper portion 22 which is open ended and is disposed above a support flange 24. As will be seen in more detail in FIG. 3, the flange and the neck portion 22 project out of an associated blow mold. In a conventional molding operation, a blow tube fits in the neck portion 22 and is sealed with respect thereto.

Immediately below the flange 24, the preform, which is generally identified by the numeral 26, has a cylindrical portion 28 and thereafter increases in thickness radially outwardly in an area identified by the numeral 30. Thereafter the preform 26 is composed of an elongated cylindrical portion 32 which is slightly tapered both internally and externally to facilitate withdrawal from the injection mold and an associated core while remaining generally of a constant thickness. The preform 26 has a substantially hemispherical bottom portion 34 which reduces in thickness towards the center thereof.

It is to be understood, however, that the dimensions of the preform will vary depending upon the particular immediately article which is to be formed.

Although there has been specifically illustrated an injection molded preform 26, it is to be understood that the preform could be formed from an extruded tube.

Figure 18:
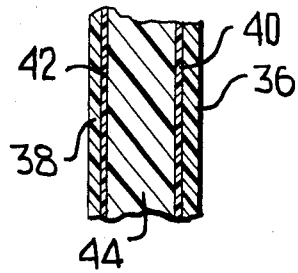
FIG. 18 is an enlarged fragmentary sectional view taken through a typical preform wherein the preform is of a laminated construction.

Reference is now made to FIG. 18 wherein there is illustrated an enlarged cross section through a typical preform which is of a laminated construction. Such a preform would have exterior and interior layers 36 and 38 which are formed of PET. Inward of these layers would be relatively thin barrier layers 40, 42 which may be formed of materials such as SARAN. Finally there will be a core 44 which may be formed of PET or a compatible polymer.

In FIG. 3 there is schematically illustrated a typical blow mold, which will be formed in split halves, and which is identified by the numeral 46. The blow mold 46 will be provided with one or more blow cavities 48 which is shaped to form an intermediate article of which a lower part is in the form of a can. The preform 26 is clamped in the cavity 48 and supported by the flange 24. Suitable conventional blowing apparatus including a blow stick (not shown) will be utilized to direct blowing gas under pressure into the preform 26 and also to axially elongate or stretch the preform 26. It is to be understood that the preform 26 will be particularly configured with respect to the cavity 48 to provide a preselected draw ratio. Further, the axial elongation or stretching of the preform 26 with respect to the cavity 48 and the expansion thereof due to the internal gas will also be controlled so as to control the resultant thickness and draw ratio of the body or sidewall of the resultant container.

In FIG. 4 there is illustrated an intermediate article 50 which has been formed from the preform 26 in the blow mold cavity 48. The lower part of the article 50 will be in the form of a can which includes a bottom wall 54, having integrally joined thereto a sidewall or body 56 with the sidewall 56 terminating in an upper outwardly directed flange 58. If desired, the sidewall 56 may be provided with internally directed vertically collapsible beads 60 to accommodate a decrease in volume within the container as the product cools. The beads 60 will be formed by internal ribs 62 of the blow mold 46.

The upper portion of the intermediate article 50 is generally identified by the numeral 64 and will be considered an adaptor portion. The adaptor portion 64 is severed from the container or can 52 by cutting such as along the line defined by the arrow A in FIG. 4. This removed adaptor portion 65 may then be reground and utilized in the forming of further preforms.

The separated container or can 52 is best illustrated in FIG. 5 wherein the flange 58 becomes the customary flange utilized for double seaming an end unit to the body 56.

Figure 6:
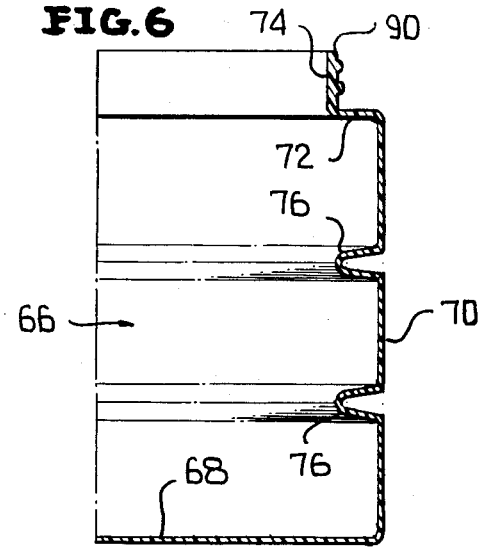
FIG. 6 is a half sectional view of a jar having a screw-threaded neck finish, which jar is formed as part of an intermediate article in the same general manner as shown in FIG. 3.

It is to be understood that the configuration of the mold cavity 48 may be modified to form an intermediate article (not shown) of which the lower part is in the form of a jar which is best illustrated in FIG. 6 and is generally identified by the numeral 66. The jar 66 will have a bottom wall 68 which closes the lower end of a sidewall or body 70. The upper end of the body is open, but in lieu of having the seaming flange 58, the upper end of the body is inwardly directed to define an annular flange 72 which has extending axially upwardly therefrom a neck finish 74 to which a conventional screw threaded or lug type closure cap may be attached. If desired, the body 70 may be reinforced by hollow ribs 76 which will be similar to the ribs 60.

Figure 7:
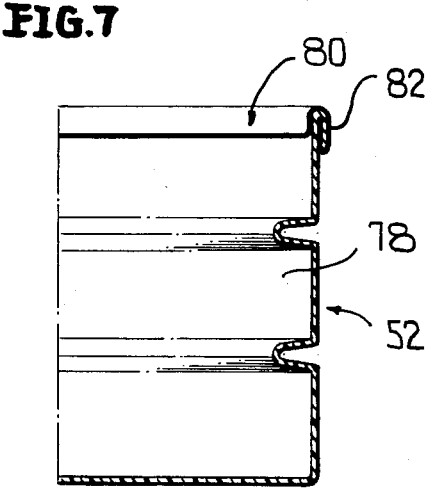
FIG. 7 is a half sectional view of the can of FIG. 5 after filling with a hot product at 190° F. and closing by securing an end unit thereto utilizing a double seam, and where a 5% volume shrinkage is permitted to occur after the double seaming.

In FIG. 7, the can 52 is illustrated as have been filled with a hot product 78 and closed by means of an end unit generally identified by the numeral 80. The illustrated end unit is in the form of a metal or composite end which is secured to the can by a conventional double seam 82 incorporating the flange 58.

Figure 8:
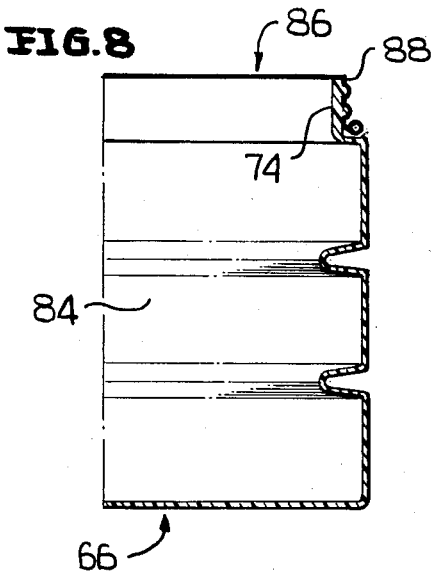
FIG. 8 is a half sectional view taken through the jar of FIG. 6 after hot filling with a product at 190° F. and closing utilizing a cover where 5% volume shrinkage is permitted to occur after closing.

In FIG. 8, the jar 66 is illustrated as being filled with a hot fill product and being closed by an end unit 86. The end unit 86 is illustrated as being in the form of a conventional closure having a depending skirt 88 which is interlocked with the neck finish 74. It is to be understood that the end panel portion of the closure 86 will be sealed relative to an end sealing surface 90 (FIG. 6) of the neck finish 74.

As previously described, when the can 52 of FIG. 5 and jar 66 of FIG. 6 are formed conventionally from a PET preform as described in the aforementioned Beck et al patent, they are susceptible to a moderate percentage of shrinkage when filled with a hot product.

FIGS. 7 and 8 show a can and a wide mouth jar after hot filling at 190° F. Total volume shrinkage for these containers produced by non-optimized process conditions are typically in the 6–10% range vs. the 15–50% values exhibited by prior art containers of the type shown in FIG. 1.

The substantial improvement in performance results from elimination of large, low orientation and essentially amorphous regions such as the closure receiving finish and shoulder to sidewall transition regions which exist in containers produced by conventional techniques.

Figure 13:
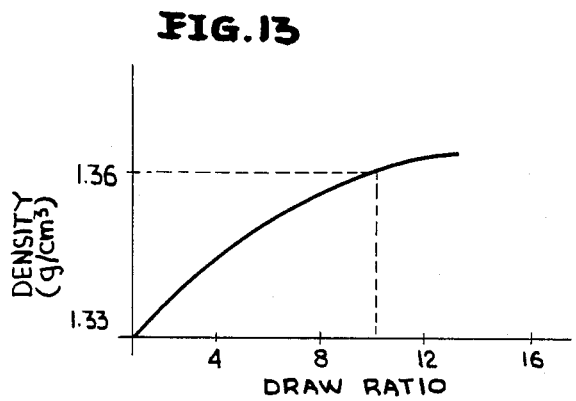
FIG. 13 is a graph of polyester density as a function of draw ratio.

FIG. 13 is a typical graph of density vs. draw ratio for crystallizable polyesters. Draw ratio is defined as:

$$DRt = \left( \frac{Db - Dp}{Dp} + \frac{Lb - Lp}{Lp} \right) \times 100$$

Where:
Db = Max Bottle OD
Dp = Min Preform ID
Lb = length of bottle below finish
Lp = length of preform below finish By orienting the finish and shoulder regions of the final container, the higher overall density (i.e. percent crystallinity and Tg) of such containers (vs. conventional containers) as shown in FIGS. 5 and 6 results in reduced thermal distortion when hot filled (without the need to thermally crystallize or "heat set").

FIGS. 13 through 16 show graphs of various relationship relevant to maximizing the density of polyester in finished containers with heat setting. Those skilled in the art will recognize the role of, and interrelationships between; tooling design, polyester composition, and process conditions (all non heat setting variables) as they influence the polyester percent crystallinity in the finished container.

FIG. 13, for example, shows how strain induced crystallization raises the density of polyester to a maximum level somewhat less than 1.37 g/cm³ at a total draw ratio greater than 8 to 1 but less than 12 to 1 for typical polyesters.

Figure 14:
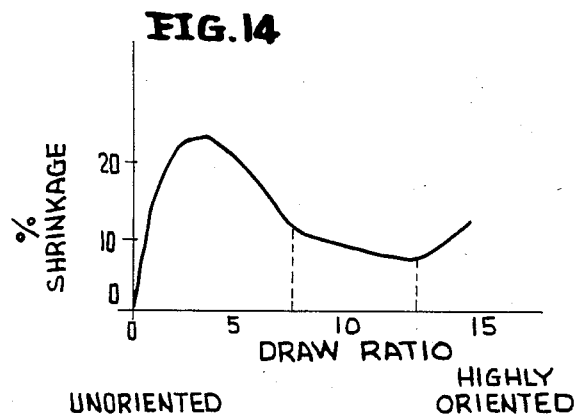
FIG. 14 is a graph of polyester shrinkage at 190° F. as a function of draw ratio.

FIG. 14 shows the negative effect of excessive drawn ratios beyond that of maximum strain hardening on percent shrinkage. It is known that total draw ratio is a controlling factor in density improvement. The ratio of axial to hoop draw, for example, is of little consequence relative to total volume shrinkage.

Figure 15:
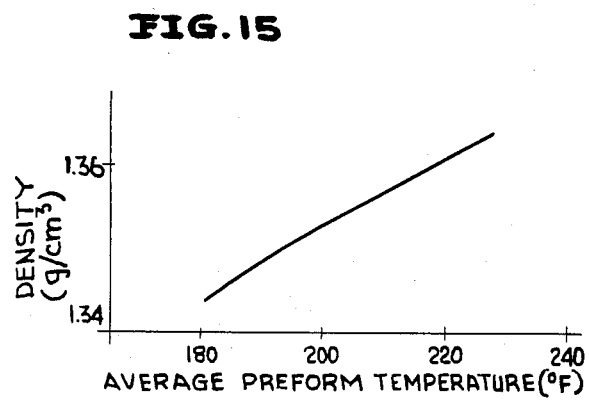
FIG. 15 is a graph of density vs. preform temperature at a fixed draw ratio.
Figure 16:
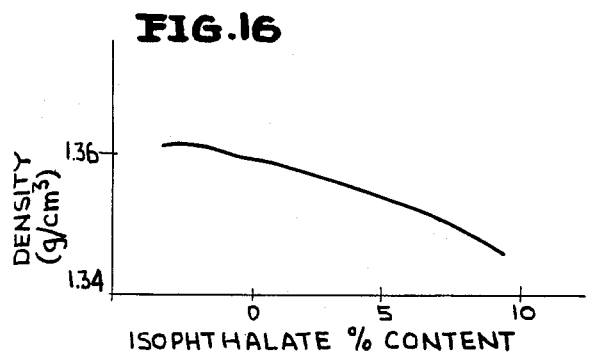
FIG. 16 is a graph of density vs. polyester comonomer contents at a fixed preform temperature and draw ratio.

As further examples of known density optimization techniques, FIGS. 15 and 16 indicate the influence of process conditions and polyester composition on density.

By combining the basic Beck et al oriented finish technology with the prior art process techniques noted above, polyester containers with overall volume shrinkage in the range of 3–5% (when hot filled at 190° F.) can be produced without heat set thermal conditioning. The average sidewall and flange/finish density of containers produced by such techniques typically exceed 1.350 g/cm³ with a maximum of approximately 1.365 g/cm³ (22–30% crystallinity).

Containers which exhibit 3–5% volume shrinkage at 190° F. do not vary substantially in appearance vs. non-exposed containers and are, as such, commercially viable for hot fill applications.

The 3–5% volume shrinkage can in fact be beneficial to reduce the internal vacuum which is created when the container contents and head space gases cool after sealing. In general, at a 190° F. fill temperature, a shrinkage induced container volume reduction of from 2–5% is sufficient to minimize the pressure forces which tend to collapse the container. To effectively eliminate the potential of vacuum collapse, it is desirable to minimize the container shrinkage which occurs during hot filling and before sealing. This is best accomplished by reducing the time interval between the onset of filling and the completion of sealing to 5 seconds or less. If the latter is not practical due to filling line and/or product constraints, it may be necessary to cool the exterior of the container during filling and prior to sealing.

Figure 12:
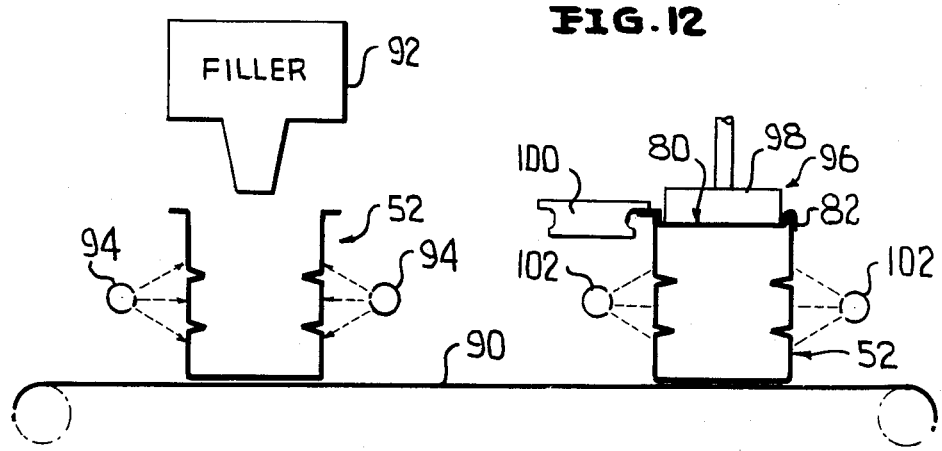
FIG. 12 is a schematic elevational view of a spray cooling device used to minimize container shrinkage during hot filling and seaming.

A spray system, as shown in FIG. 12, has been found to effectively increase the permissible fill/seam time interval by a factor of 10 or more.

Reference is now made to FIG. 1 wherein there is illustrated the manner in which a can, such as the can 52, but formed in accordance with this invention, is filled and then sealed. There is schematically illustrated a support 90 on which the can 52, for example, is seated at which time it is seated beneath a suitable filler 92 from which a hot fill product is dispensed into the can 52. At the time the can 52 is being filled, it may simultaneously be cooled by means of spray ducts 94. The spray ducts 94 may spray cool water on the can 52 or a suitable cooling gas.

After the can 52 has been filled, it may be, after a suitable delay, passed to a closing machine generally identified by the numeral 96 which applies in a conventional manner the end unit 80 and forms the double seam 82. Only the backup chuck 98 and one of the forming rolls 100 of the closing machine or double seamer 96 is illustrated.

Associated with the closing machine and positioned to spray the can 52 as it is being closed are spray ducts 102. Like the spray ducts 94, the spray ducts 102 may spray either cool water or a cooling gas onto the can 52 as it is being closed.

The above "controlled" shrinkage process effectively eliminates the need for radical container geometries or excessive wall thicknesses. It is, however, desirable to utilize the stiffening ribs or beads 60, 76, as shown in FIGS. 5 and 6, to prevent collapse due to low level residual vacuum levels and to long term water vapor transmission (and the resulting partial internal vacuums generated over extended product shelf life periods).

The following specific examples are intended to illustrate more fully the nature of the present invention without limiting its overall scope:

EXAMPLE 1

This example demonstrates the production of a 411×501 polyester can which exhibits 6–8% volume shrinkage when hot filled at 190° F. A 62 gram preform as shown in FIG. 3 having a length of 4.95 inches below the flange and an outside diameter of 1.56 inches with an average wall thickness of 0.180" was produced from a PET copolymer (2% by weight isophthalate) having an intrinsic viscosity of 0.80±0.1.

The preform was reheated on a conventional stretch blow molding machine equipped with a quartz IR reheat oven, at an overall machine cycle of 5.0 seconds. The preform temperature just prior to stretch blowing was measured (using an IR pyrometer) at 200° F. Blow mold temperature was maintained at 35° F.

The trimmed container was filled with water at 190° F. to within 0.625 inches of the flange and allowed to cool to room temperature. The total volume loss was then measured at 8.2%. The average sidewall density averaged 1.348 grams/cm³ and as such a fully developed/strain induced crystalline structure was not achieved.

EXAMPLE 2

This example demonstrates the production of a polyester can as per Example 1 with the tooling, material and process conditions optimized to yield 3–4% volume shrinkage when hot filled at 190° F.

The same preforms used in Example 1 were reheated at an identical oven resident time, however, the quartz lamp energy outputs were increased to raise the preform temperature to a maximum (prior to the onset of visible crystallinity). In addition, the vertical preform temperature profile as well as the degree of axial preform stretch prior to the onset of pressure expansion was altered to reduce the wall thickness of the blown container to 0.015 inches. All other process and evaluation conditions were identical to those used in Example 1.

Total volume shrinkage was 4.2% and average sidewall density was 1.362 grams/cm³. As such, a fully developed, highly transparent, stain/thermally induced crystalline structure was developed.

EXAMPLE 3

This example demonstrates the effectiveness of controlled container shrinkage in preventing vacuum induced collapse.

Figure 10:
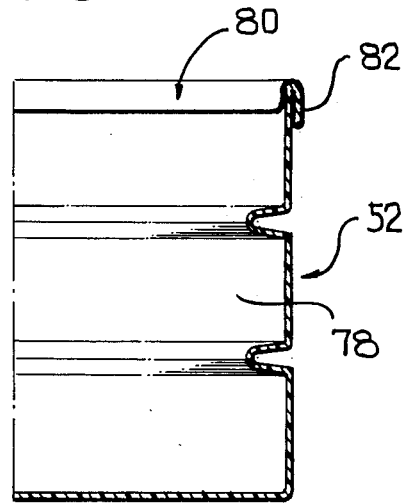
FIG. 10 is a half sectional view showing a can similar to that of FIG. 5 and closed in the manner shown in FIG. 7 formed in accordance with this invention and hot filled and sealed when less than 1% volume shrinkage is permitted.
Figure 11:
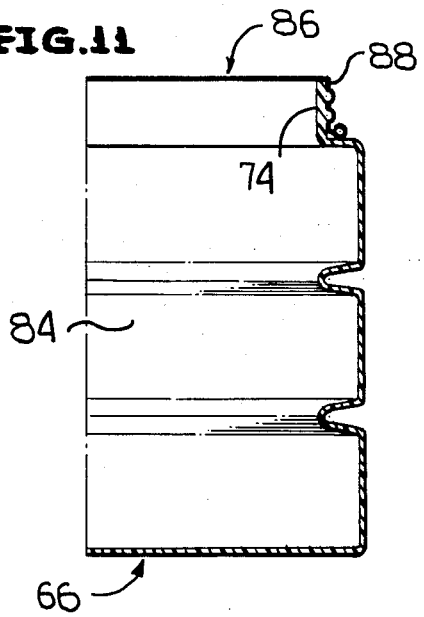
FIG. 11 is a half sectional view similar to FIG. 10 but showing a jar closed in the manner shown in FIG. 8 and wherein less than 1% volume shrinkage is permitted.

Ten (10) polyester cans produced, as per Example 2, were hot filled with water at 190° F. to a level 0.625 inches below the flange and permitted to stand for 10 seconds prior to double seaming. All samples exhibited vacuum induced collapse (as shown in FIG. 10).

An additional ten (10) cans from the same lot were hot filled at 190° F., double seamed within 2 seconds, and immediately placed in a water bath and cooled to ambient. All samples collapsed prior to removal.

A final group of ten (10) cans from the same lot were filled at 190° F., seamed within 2 seconds and permitted to shrink under ambient conditions. None of the samples exhibited vacuum induced deformation.

EXAMPLE 4

This example demonstrates the production of a polyester wide mouth jar with controlled finish and sidewall shrinkage.

An 80 gram preform with a length below the finish of 6.31" and an average wall thickness of 0.185" was produced by conventional injection techniques using a polyester homopolymer of 0.80±0.1 IV.

The preform was reheated in a quartz oven to a temperature of 225° F., with the vertical temperature profile and stretchblow conditions adjusted to yield a 70 mm CT, 24 oz. container (as shown in FIG. 6) with a finish wall thickness of 0.025 inches and an average sidewall thickness of 0.015 inches.

Upon trimming and hot filling at 190° F. the overall volume loss was 5.2% with a finish diameter reduction of 2.0% vs. a panel diameter reduction of 3.2%. Average density of the finish and body sidewall areas were measured at 1.360 vs 1.356 respectively. Control containers using prior art injection molded finishes as per FIG. 1B showed unacceptable deformation and overall volume loss.

EXAMPLE 5

This example demonstrates the synergistic effect of combining the inherent Glastik oriented finish or flange advantages with known heat set techniques.

Preforms as utilized in Examples 1 and 2 and reheated as per Example 2 were stretch blown into the same blow mold as per Examples 1 and 2. The latter, however, was maintained at 250° F. for 10 seconds (vs. 35° for 1.5 seconds in Examples 1 and 2).

The resulting containers when hot filled exhibited 0.4% volume loss at 190° F.

Preforms as utilized in Example 4 and reheated as per the same were stretch blown into the same blow mold as per Example 4. The latter, however, was maintained at 250° F. for 10 seconds (vs 35° F. for 2.0 seconds in Example 2).

The resulting containers exhibited transparent finish and shoulder regions as well as 0.8% volume loss at 190° F.

By contrast, a 49 gram container of the same shape and size produced by a conventional injection blow process heat set process exhibited a semi-opaque finish and shoulder region and 1.6% volume loss at 190° F.

Figure 17:
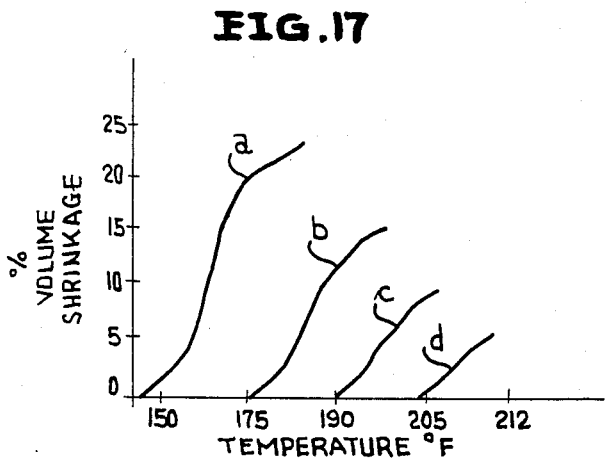

A graphic representation is shown in FIG. 17. The curves represent containers produced as follows:

Curve a Conventional non-heat set technology
Curve b Non-heat set Beck et al
Curve c Prior art conventional heat set
Curve d Heat set Beck et al

We claim:

1. A method of forming a thermal collapse-resistant highly oriented polyester container for use in hot fill applications, said method comprising the steps of:

(a) providing a polyester preform, reheating the preform, placing the preform in a blow mold cavity and distending the preform to match the blow mold cavity to form an intermediate article including a container having an oriented end unit receiving finish of a diameter materially greater than the diameter of the preform;

(b) characterized in that in providing the preform the composition of the polyester, the draw ratio during distending of the preform and reheat conditions are all controlled in the absence of heat setting to provide the container with a sidewall and finish density in the range of 1.350 to substantially but less than 1.370 grams/cubic centimeter, which density corresponds to 14% to 28% crystallinity, the draw ratio being in the range of 8-10 to 1; and (c) removing the intermediate article from the mold and separating the container from the remainder of the intermediate article with the container having a shrinkage of no greater than 5% at a 190° F. fill temperature.

2. A method according to claim 1 wherein the remainder of the intermediate article is recycled in the forming of further preforms.

3. A method according to claim 1 wherein the controlled polyester composition has an intrinsic viscosity on the order of 0.80±0.1.

4. A method according to claim 1 wherein the temperature of the reheated preform ranges generally between 180° F. to 250° F.

5. A method according to claim 3 wherein the temperature of the reheated preform ranges generally between 180° F. to 250° F.

6. A method according to claim 1 wherein the temperature of the reheated preform is on the order of 225° F. with there being an axial temperature profile.

7. A method according to claim 1 wherein the provided preform is of a multi-layer structure.

8. A method according to claim 1 together with the step of internally cooling the container prior to removing the intermediate article from the mold.

9. A method according to claim 1 wherein each container is filled with a hot product and then closed, and each such container is cooled during the hot filling and before closing to effect a substantial portion of container shrinkage due to hot filling to occur after sealing.

10. A method according to claim 9 wherein the container cooling is effected by fluid cooling of the water and gas type.

* * * * *